United States Patent [19]
Pennings et al.

[11] 3,917,051
[45] Nov. 4, 1975

[54] UNLOADING DEVICE WITH A VERTICAL CONVEYOR

[75] Inventors: Pieter Pennings; Gerhard Scholler, both of Bad Schwartau, Germany

[73] Assignee: Orenstein & Koppel AG, Luebeck, Germany

[22] Filed: Sept. 18, 1974

[21] Appl. No.: 507,055

[30] Foreign Application Priority Data
Oct. 5, 1973 Germany............................ 2350097
May 3, 1974 Germany............................ 2421374

[52] U.S. Cl. .................................. 198/91; 214/14
[51] Int. Cl.² ......................................... B65G 63/00
[58] Field of Search......... 214/10, 14, 15 E; 198/91, 198/94, 36, 102, 88, 123, 141, 142

[56] References Cited
UNITED STATES PATENTS
| | | | |
|---|---|---|---|
| 3,387,721 | 6/1968 | Ludwig............................. | 198/94 X |
| 3,640,376 | 2/1972 | Peuker et al......................... | 198/91 |
| 3,756,375 | 9/1973 | Briggs.............................. | 214/14 X |

*Primary Examiner*—Frank E. Werner
*Attorney, Agent, or Firm*—McGlew and Tuttle

[57] ABSTRACT

An unloading device includes a support jib, for example, of a type which is adapted to be carried by a gantry, which is movable along a pier or dock for unloading vessels. The outer end of the support jib includes a vertical conveyor support member which has a roller bearing assembly supported thereon on which is rotatable a return wheel of the vertical conveyor. The vertical conveyor also includes a vertical support rod or support member which is pivoted on the vertical conveyor support member for pivotal movement about a horizontal axis below the return wheel. The vertical conveyor support arm carries a plurality of roller guide means for an endless conveyor member such as a bucket conveyor which is also guided over the return wheel. One or more drive motors are advantageously carried either directly on spaced circumferential mountings around the support member and the jib or on an upward extension of the support arm, and each carries a driving pinion which is engageable with an annular gear which is affixed to the return wheel. A plurality of separate drive members may be located at spaced locations around the circumference of the internal drive gear connected to the return wheel and they may be situated either directly on the jib support member or on the vertical conveyor arm which may be supported on one of the rings of the rotatable support bearing.

15 Claims, 6 Drawing Figures

UNLOADING DEVICE WITH A VERTICAL CONVEYOR

BACKGROUND OF THE INVENTION

1. Field of the Invention

This invention relates in general to the construction of conveyor unloading devices and, in particular, to a new and useful unloading device which includes a support jib having an outer vertical conveyor support member which provides a means for rotatable mounting of a return wheel of the vertical conveyor and the pivotal mounting of a vertical conveyor rod which contains guide rollers for the vertical conveyor endless member and wherein, the construction permits one or a plurality of separate drives for the return wheel of the vertical conveyor.

2. Description of the Prior Art

The invention deals particularly with devices for unloading of storage bins or ships wherein a vertical conveyor must be moved into a rather deep compartment in order to remove the material therefrom. A known conveying device of this type for loosening and conveying loose material, in particular sticky or lump material, comprises a lowerable jib and a bucket elevator mounted for pivotal movement about a horizontal axis and carried by the jib. In such a device, the driving shaft of the upper return wheel is coaxial of the horizontal pivot axis of the bucket elevator. In addition, the upper return wheel of the bucket elevator is designed as a unilaterally opened pot having a cylindrical surface with openings. Through these openings, the loose material which is received in the buckets can be discharged onto a fixed chute located within the return wheel and passed on to a delivery belt.

Another unloader for loose material is known which includes a bucket elevator as the receiving mechanism and a steep conveyor discharging onto a conveyor belt which is located above the upper deflection of the bucket elevator chains. In this construction, the bucket elevator is equipped with a supporting frame for the bucket elevator chains, and it is a rigid frame, which is mounted for pivotal movement about the rotational axis of the upper deflection of the bucket elevator chains so that the pivotal axis of the supporting frame coincides with the rotary axis of the upper chain deflection of the bucket elevator. The swivel bearings are four large antifriction bearings mounted coaxially on the support of the conveyor belt, of which the two outer ones carry the supporting frame of the bucket elevator chains. The return tumbler driving the bucket elevator chains is mounted on the bearing parts of the two inner large antifriction bearings which are provided with gear rims.

SUMMARY OF THE INVENTION

The present invention provides a conveying or unloading device wherein the weight and costs of the mounting of the upper return wheel of the vertical conveyor are reduced to a minimum and many bearing component parts are saved. With the inventive arrangement, the supporting arm of the vertical conveyor is secured laterally of the upper return wheel and in a position in which one or more driving units may be employed for driving the annular gear connected to the return wheel. In one embodiment, the supporting arm of the vertical conveyor is secured laterally of the upper return wheel and at a side which is remote from the conveyor belt. The jib carrying the conveyor belt is firmly connected to the middle ring of the bearing supporting the return wheel, and the return wheel is mounted in an overhung position on the inner ring of the bearing. The outer ring of the bearing supports the vertical conveyor supporting arm. With such a construction, only one antifriction bearing is provided for the rotation of the return wheel of the vertical conveyor. Consequently, the weight and cost of the displacement mechanism and the front portion of the jib carrying the conveyor belt can be reduced.

In another embodiment, a ring of the double antifriction bearing is secured to the end of the jib. The supporting arm of the vertical conveyor and the upper return wheel are mounted on the bearing in an overhung manner. This arrangement has the advantage that the mounting of the device is facilitated because no difficulties arise if both the upper end of the supporting arm and the upper return wheel are put in place in the freely accessible bearing. Another advantage is that the upper end of the supporting arm can be designed as a closed disc and not as an annular support. The stiffness of the mounting of the supporting arm is thereby increased.

In accordance with a further development of the invention, the middle ring of the double antifriction bearing may be firmly connected to the end of the jib with the result of an increased ability of the mounting and ease of the assembly. A simple construction in this respect is provided wherein the outer ring of the double antifriction bearing carries the upper return wheel and the inner ring of the double antifriction bearing carries the supporting arm.

In order to further simplify the construction, and to facilitate the mounting of the parts, the bucket chain drive may be secured to the upper part of the supporting arm. A plurality of bucket chain drives may be provided which are offset with respect to each other and disposed so that all of their driving pinions engage the annular gear of the upper return wheel. This latter provision ensures a vast simplification of the drive and a reduction in the weight of the construction and, in addition, provides a very versatile driving arrangement. The outer ring of the double antifriction bearing which carries the return wheel may also carry a gear rim with which the pinion or pinions of the bucket chain drives are engaged.

Accordingly, it is an object of the invention to provide an improved unloading device which includes a supporting jib having an outer end with a vertical conveyor support member, and with a roller bearing assembly supported on said support member along with a vertical conveyor support arm which carries conveyor guide roller means on its lower end for an endless conveyor member which is driven by a return wheel rotatably mounted on the support bearings and which is driven from drive pinions engaged with an annular gear carried by one of the outer and inner rings of the support bearings and a drive motor which drives the gear through a drive pinion which is supported in a fixed position relative to the annular gear.

A further object of the invention is to provide a conveyor system for unloading and similar operations which is simple in design, rugged in construction, and economical to manufacture.

The various features of novelty which characterize the invention are pointed out with particularity in the claims annexed to and forming a part of this disclosure.

For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
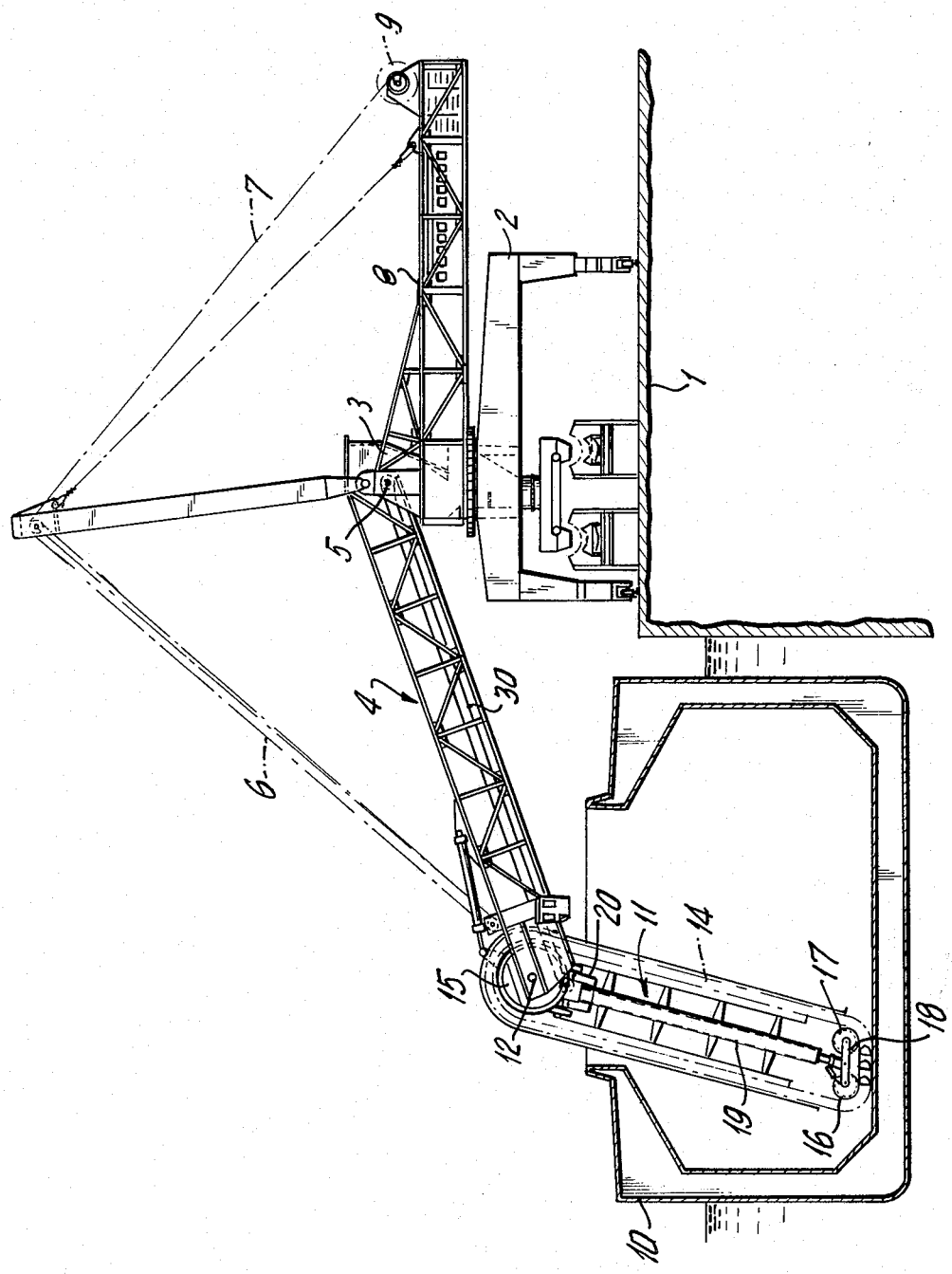
FIG. 1 is a side elevation view of a ship unloading device constructed in accordance with the invention.
Figure 2:
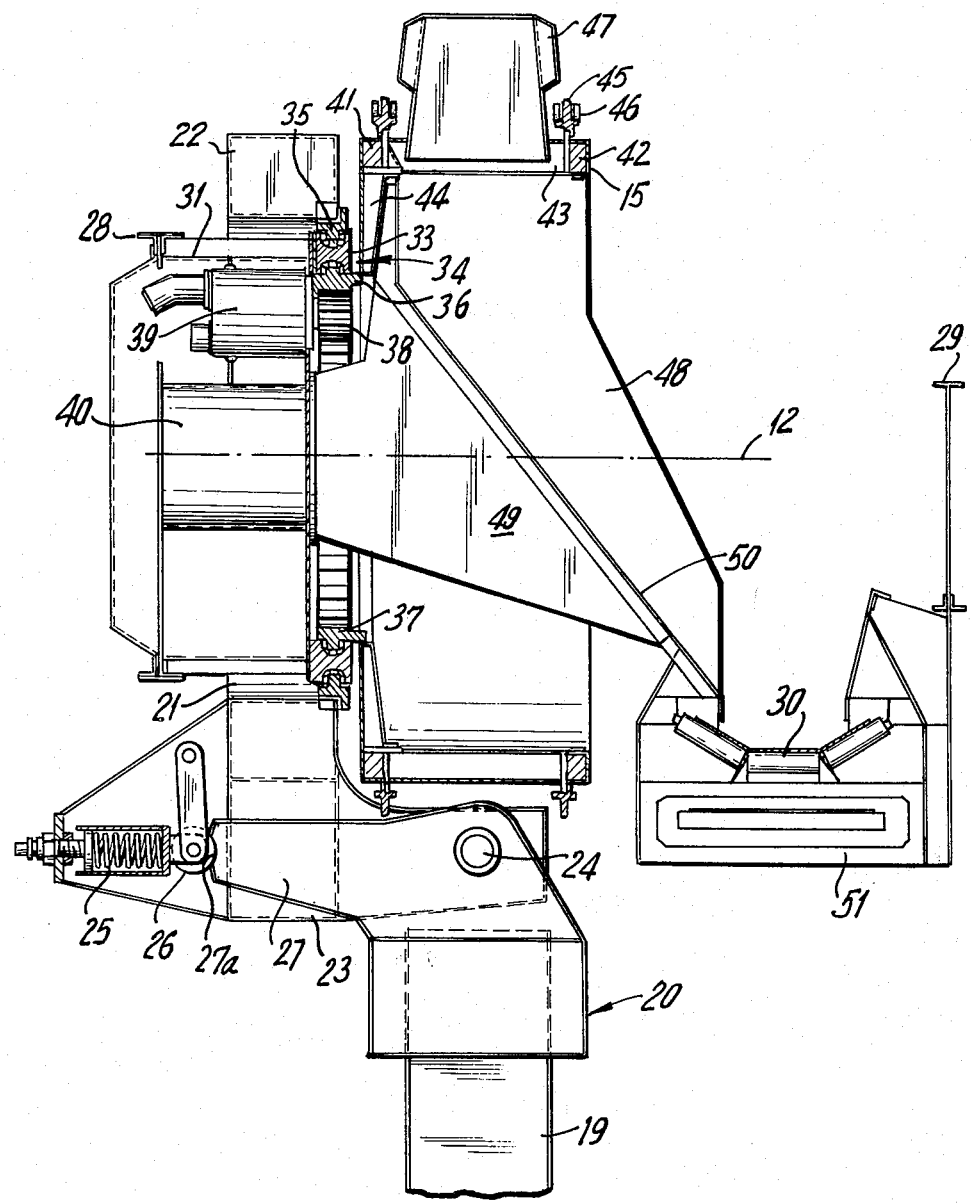
FIG. 2 is a partial elevational and partial sectional view showing the connection of the vertical conveyor to the jib.
Figure 4:
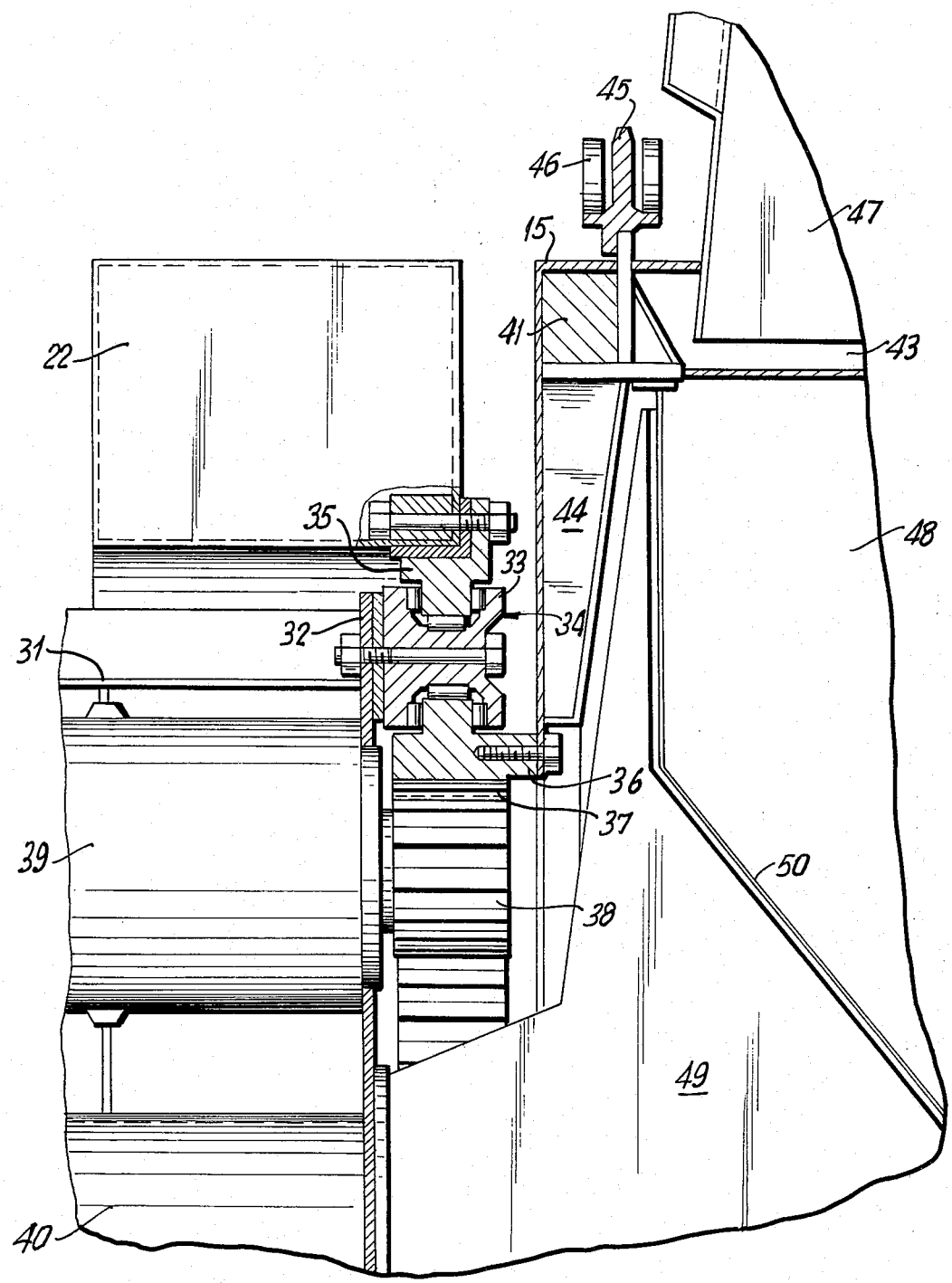
FIG. 4 is a section similar to FIG. 2, but in more detail.

Referring to the drawings in particular, the invention embodied therein in FIGS. 1, 2 and 4 comprises a ship unloading device which includes a gantry 2, which is adapted to move on a trackway along a pier or guay 1. Gantry 2 carries a superstructure 3 which may be swivelled through 360° and which includes a jib 4 hinged to the superstructure 3 for pivotal movement about a horizontal axis 5. The jib is retained by a tackle 6. The rope end 7 of tackle 6 is attached to a hoisting winch 9 located on the counterweight jib 8.

In accordance with the invention, the end of jib 4 which faces a ship 10, carries a vertical conveyor 11 which is pivotable about a horizontal axis 12 which extends transversely of jib 4. Vertical conveyor 11 comprises a bucket chain endless member or conveyor 14 which is passed at its upper end around a return wheel 15 and which is guided at its lower end by conveyor guide roller means in the form of wheel or pulleys 16 and 17. Corner pulleys 16 and 17 are mounted on a two-armed lever 18 which is carried at the lower end 19 of supporting arm 20 of vertical conveyor 11.

In accordance with the invention, supporting arm 20 includes an upper L-shaped part 21 which is formed as a circular ring carrier 22 and a lower or bottom third part 23 which extends at right angles to the upper part and is positioned below the upper return wheel 15. The lower part 19 of supporting arm 20 is pivoted to a cross bracket 23 and it may be swung about the horizontal pivot 24. As shown in FIG. 2, a locking mechanism 25 which is carried on the cross bracket 23 includes a spring-biased piston which carries a roller 26 which is biased into a detent or recess 27a of an extension 27 of the vertical conveyor support arm 20. At the occurrence of lateral forces, the locking mechanism 25 permits a swinging of the lower part 19 of arm 20 within predetermined limits and, at the same time, it comprises a mobile connection between upper part 21 of the supporting arm 20 and lower part 19.

Jib 4 includes spaced outer supports 28 and 29 and an upper return wheel 15 is rotatably mounted therebetween and it is positioned laterally of a conveyor belt 30 which is also supported by the jib. The outer support 28 is provided with an annular support portion 31 which comprises a connection plate 32. A middle ring 33 is mounted on the projecting portion of connection plate 32 and it is part of a double antifriction bearing, generally designated 34. An outer ring 35 of bearing 34 is mounted on middle ring 33 by means of roller members and an upper part 21 of supporting arm 20 surrounds annular support 31 and is designed as a circular ring carrier 22 which is bolted to outer ring 35. An inner ring 36 of double antifriction bearing 34 is mounted by means of rolling members on the inner race of middle ring 33 and it is connected to the upper return wheel 15. An annular gear or gear rim 37 is secured to the side of inner ring 36 which is remote from the middle ring 33 and it is in meshing engagement with a driving pinion 38 of the bucket chain drive which includes at least one drive motor 39. The bucket chain drive mechanism may include a plurality of drive units 39 and with drive pinions 38 mounted around the interior of the annular support 31 on the tubular main support 40. Due to the inventive arrangement of the gear 37, a plurality of bucket chain drives 39 of the same type may also be located within annular support 31.

Another advantage of the invention is that ship unloaders which include bucket elevators with mutually unequal chain forces may be equipped with identically designed chain bucket drives and they may differ from each other only in respect to the different number of bucket chain drives and the driving force thereof.

In the embodiment of FIGS. 1, 2 and 4, upper return wheel 15 comprises two ring bars 41 and 42 which are connected to each other by crossbars 43. The ring bar 41 is secured to a tumbler web 44 which is connected to the inner ring 36 of the antifriction bearing 34. Tumbler teeth 45 project from the outer circumference of ring bars 41 and 42 and these engage into the bucket elevator chains or endless members 46 and drive them. Buckets 47 are located between two bucket elevator chains 46. A discharge 48 is mounted on the interior of the return wheel 15 and its mount 49 is supported by main support 40 of bucket chain drive 39. Guide plates 50 of discharge chute 48 lead to conveyor belt 30 whose supporting frame 51 is secured to outer support 29.

Figure 3:
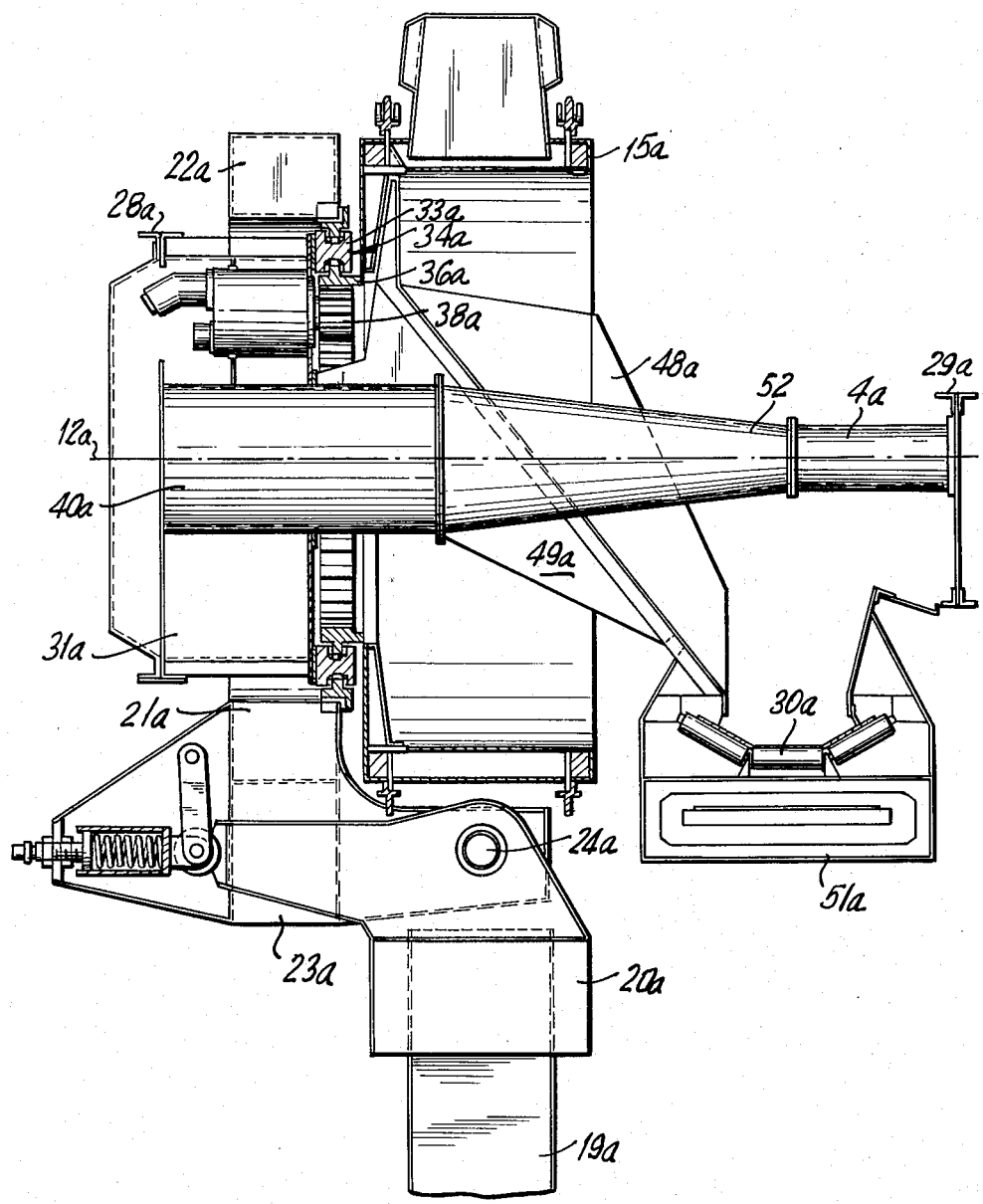
FIG. 3 is a view similar to FIG. 2, but showing a slightly modified version.

In the embodiment shown in FIG. 3, similar parts are similarly designated, but with the letter *a* thereafter. In this embodiment, the jib 4a includes a main support 40a which is extended in the direction of the conveyor belt 30. The extension of the main support 40 is followed by a tubular connection member 52 which is secured to the outer support 29a and connects the two outer supports 28a and 29a. With this arrangement of the outer supports, the torque produced by the unilateral arrangement of the vertical conveyor and the conveyor belt, respectively, at the respective outer support is eliminated.

Figure 5:
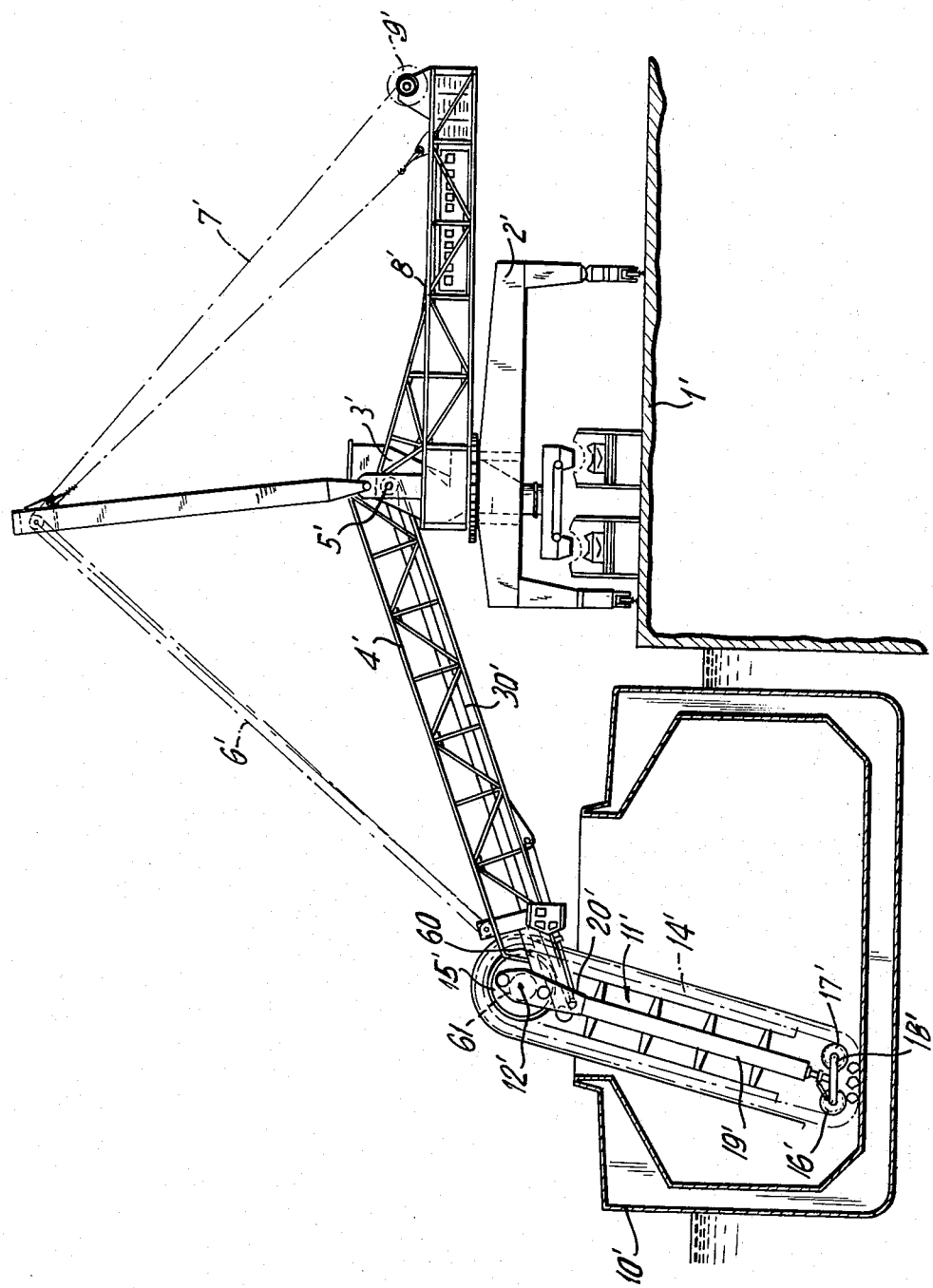
FIG. 5 is a view similar to FIG. 1 of another embodiment of the invention.
Figure 6:
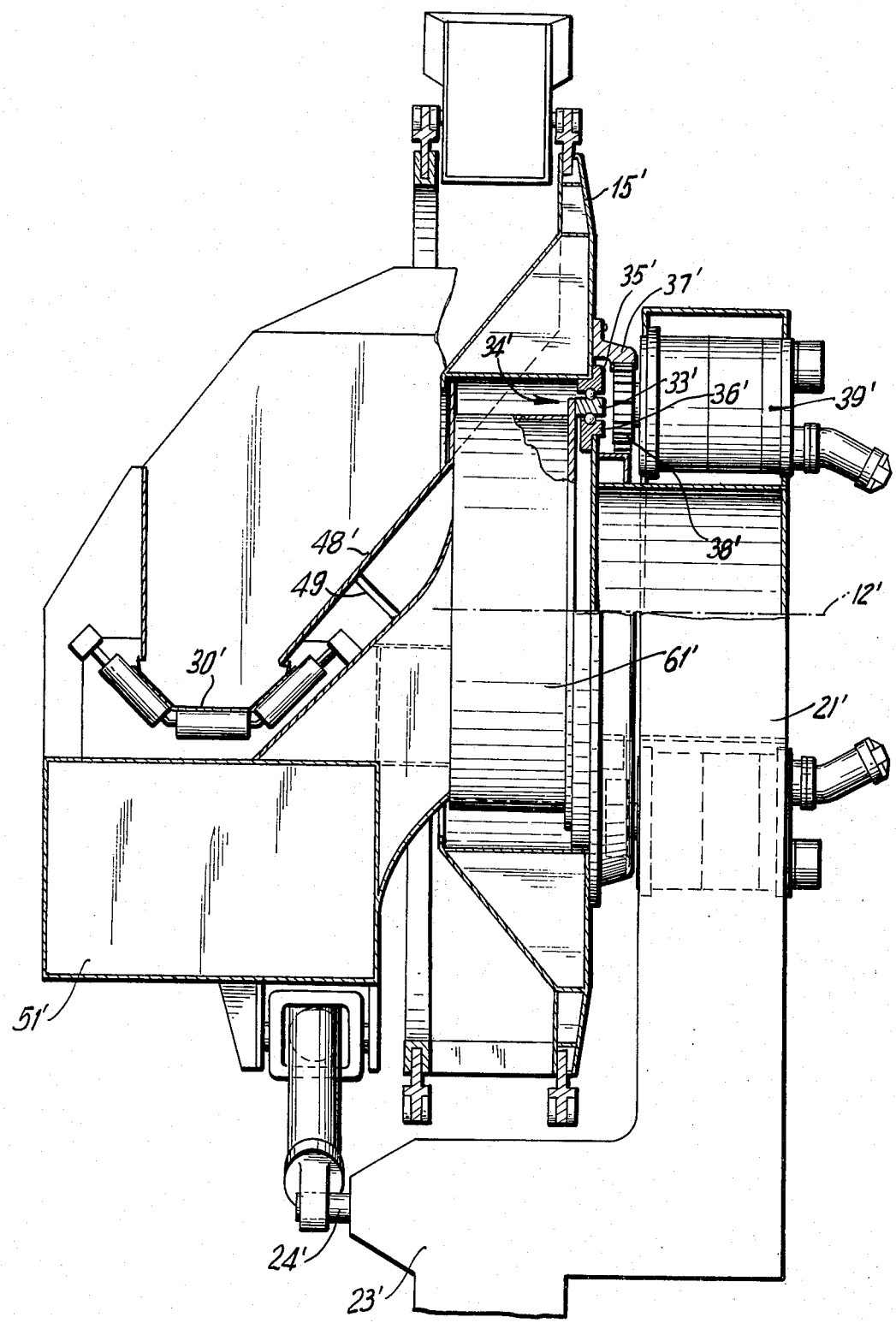
FIG. 6 is an enlarged partial elevational view of the connection of the vertical conveyor to the jib in the embodiment of FIG. 5.

In the embodiment shown in FIGS. 5 and 6, the parts are similarly designated, but with primes added. In this construction, a front end 60 of jib 4' carries a main support 61 having a circular cross-section, to which the middle ring 33' of a double antifriction bearing 34' is secured. An inner ring 36' of double antifriction bearing 34' is firmly connected to upper part 21' of supporting arm 20'. This upper part 21' is designed as a closed disc. A return wheel 15' is secured to outer ring 34' of double antifriction bearing 34'.

Upper part 21' of supporting arm 20' supports a plurality of bucket chain drives 39', of which only one, which is located in the upper zone, is shown. Driving pinions 38' of these drives engage gear rim 37' which is secured to return wheel 15'. Gear rim 37' may also be secured directly to the outer ring 34' of the double antifriction bearing 34'.

The arrangement of a plurality of bucket chain drives 39', of which only one is represented, and with all of their driving pinions 38' engaged with the annular gear 37', has the advantage that ship unloaders which include bucket elevators with mutually unequal chain forces may be equipped with identically designed bucket chain drives and differ from each other only in the number of drives which are used.

Discharge chute 48' is mounted in the interior of upper wheel 15' and its mount 49' is secured to the main support 61 of the double antifriction bearings 34'. The guide plates of the discharge chute 48' lead to the conveyor belt 30'. The supporting frame 51' of the conveyor belt 30' is secured to the front end 60 of the jib 4'.

While specific embodiments of the invention have been shown and described in detail to illustrate the application of the principles of the invention, it will be understood that the invention may be embodied otherwise without departing from such principles.

What is claimed is:

1. An unloading device, comprising a support jib having an outer end with a vertical conveyor support member, a roller bearing assembly supported on said support member, a vertical conveyor including a vertical conveyor support arm pivoted on said support member, conveyor guide roller means on said support arm, a conveyor return wheel supported on said roller bearing assembly for rotative movement, and an endless conveyor member engaged over said return wheel and said guide roller means; said bearing assembly including a middle ring and an outer ring around said middle ring, and an inner ring within said outer ring, all relatively rotatable in respect to each other, an annular gear carried by one of said outer and inner rings and connected to said return wheel, and at least one drive motor having a drive gear connected to said annular gear and supported in a position adjacent said annular gear for driving said gear and said return wheel.

2. An unloading device, according to claim 1, wherein said vertical conveyor support member of said jib comprises an annular member carrying the middle race of said antifriction bearing, said vertical conveyor support arm having an upper annular portion engaged on the outer race of said bearing.

3. An unloading device, according to claim 2, wherein said drive motor and drive gear are supported within the annular portion of said support arm.

4. An unloading device, according to claim 2, wherein said return wheel is overhung on said bearing assembly on the exterior of said annular support portion of said support arm.

5. An unloading device, according to claim 4, wherein said jib vertical conveyor support arm includes two spaced apart support members, one having an annular portion and carrying said middle ring of said bearing assembly, said return wheel carrying said inner ring and extending outwardly from said annular portion between said supports, said drive motor and drive gear being carried within said annular portion of said support and said annular gear being carried by said inner ring of said bearing assembly.

6. An unloading device, according to claim 5, including a delivery chute carried by said return wheel and extending laterally thereof between said supports, and a conveyor carried by one of said supports located at the lower end of said delivery chute.

7. An unloading device, according to claim 1, wherein said support arm of said jib includes a disc-shape support end carrying the middle ring of said bearing assembly, said return wheel being rotatable about said disc-shape support.

8. An unloading device, according to claim 7, wherein said return wheel carries said annular gear, said drive motor and said drive gear being mounted on said vertical conveyor support arm.

9. An unloading device, according to claim 8, wherein said vertical support arm is carried on the inner ring of said bearing assembly, the outer ring carrying said return wheel and said annular gear.

10. An unloading device, comprising a support jib having an outer end with a vertical conveyor support member thereon, a roller bearing assembly supported on said support member and including a middle ring, an outer ring, and an inner ring concentrically arranged and rotatable relative to each other, said vertical conveyor including a return wheel rotatable on said bearing assembly, a vertical conveyor support arm pivoted on said support member and having guide roller means, and an endless conveyor member engaged over said guide roller means and said return wheel, support arm mounting means on said conveyor support member carried by one of said rings of said bearing assembly and supporting said support arm laterally of said return wheel on the side thereof opposite to the support for said vertical conveyor support arm, said return wheel being mounted in an overhung position between said conveyor and said mounting for said support arm on the inner ring of said bearing assembly.

11. An unloading device, according to claim 10, wherein said annular gear is carried by the inner ring of said bearing assembly and drive means carried by said support member and including at least one driving pinion engaged with said gear.

12. An unloading device, according to claim 10, wherein said supporting arm includes an upper L-shape part, a supporting part carried by said outer ring pivotally supporting said L-shape part, said L-shape part having an outer end with a detent and locking means biased into said detent for holding said L-shape part and said arm against movement.

13. An unloading device, according to claim 10, wherein said support member includes a tubular extension, and an annular member connected to said tubular extension and carried by said middle ring.

14. An unloading device, according to claim 10, wherein said support member includes spaced apart support elements with a supporting structure extending through said return wheel.

15. An unloading device, comprising a support jib having an outer end with a vertical conveyor support member portion, a roller bearing assembly mounted on said support member and including middle, outer and inner concentrically arranged rings relatively rotatable in respect to each other, a vertical conveyor including a vertical conveyor suppport arm pivoted on said support member, guide roller means on said support arm, a conveyor return wheel suppported on said roller bearing assembly for rotative movement and an endless conveyor member engaged over said return wheel and said guide roller means, said jib support member including a disc member connected to said middle ring, said return wheel being rotatable around said disc member, said support arm having an upper portion connected to said inner ring, and a drive motor carried on said upper portion of said support arm and having a drive pinion and an annular gear carried by said outer ring engaged with said drive pinion.

* * * * *